(12) United States Patent
Gardner et al.

(10) Patent No.: US 6,256,985 B1
(45) Date of Patent: Jul. 10, 2001

(54) DEVICE FOR ENERGY CONVERSION FROM WAVE MOVEMENT

(75) Inventors: Fred Ernest Gardner, Zwaag; Rudolfus Gerardus Van Schie, Heerhugowaard, both of (NL)

(73) Assignee: A.W.S.B.V. (NL)

( * ) Notice: Subject to any disclaimer, the term of this patent is extended or adjusted under 35 U.S.C. 154(b) by 0 days.

(21) Appl. No.: 09/486,885

(22) PCT Filed: Sep. 4, 1998

(86) PCT No.: PCT/NL98/00509

§ 371 Date: May 19, 2000

§ 102(e) Date: May 19, 2000

(87) PCT Pub. No.: WO99/11926

PCT Pub. Date: Mar. 11, 1999

(30) Foreign Application Priority Data

Sep. 4, 1997 (NL) .................................................... 1006933

(51) Int. Cl.[7] .................................................... F03B 13/24
(52) U.S. Cl. ............................................... 60/398; 60/496
(58) Field of Search ............................ 60/398, 495, 496, 60/497, 498; 290/53, 42; 417/331

(56) References Cited

U.S. PATENT DOCUMENTS

| 875,042 | * | 12/1907 | Bissell | 60/398 |
|---|---|---|---|---|
| 4,207,741 | * | 6/1980 | Rainey | 60/496 |
| 4,208,878 | * | 6/1980 | Rainey | 60/496 |
| 4,284,901 | * | 8/1981 | Giguere | 290/53 |
| 4,363,213 | * | 12/1982 | Paleologos | 290/53 X |
| 4,598,211 | * | 7/1986 | Koruthu | 290/53 |
| 4,603,551 | * | 8/1986 | Wood | 60/496 |
| 5,426,332 | * | 6/1995 | Ullman et al. | 290/53 |

FOREIGN PATENT DOCUMENTS

| 1292638 | 12/1991 | (CA) . |
| 1589256 | 5/1981 | (GB) . |
| 1604372 | 12/1981 | (GB) . |
| 9517555 | 6/1995 | (WO) . |

* cited by examiner

Primary Examiner—John E. Ryznic
(74) Attorney, Agent, or Firm—Webb Ziesenheim Logsdon Orkin & Hanson, P.C.

(57) ABSTRACT

The invention relates to a device for energy conversion from wave movement in water, comprising a frame connectable to the bottom, a container for containing a gas, which container is formed by at least two parts, a first part connected to the frame and a second part displaceable in vertical direction relative to the first container part, energy converting means for energy conversion from the displacement of the second container part, and means for varying the volume of the space in the container intended for containing gas.

13 Claims, 2 Drawing Sheets

DEVICE FOR ENERGY CONVERSION FROM WAVE MOVEMENT

BACKGROUND OF THE INVENTION

1. Field of the Invention

The invention relates to a device for energy conversion from wave movement in water, comprising a frame connectable to a seabed, a container for containing a gas, which container is formed by at least two parts, a first part connected to the frame and a second part displaceable in vertical direction relative to the first container part for varying the working volume of the container, and energy converting means for energy conversion from the displacement of the second container part.

2. Description of the Prior Art

There exist wave energy converters which have a gas-filled container which is situated below the water surface. Due to wave movements on the water surface pressure differences will occur periodically under the water surface. The pressure differences result in vertical movement of the gas-filled container, which movement can for instance be converted to drive a generator. Such an apparatus is disclosed in GB 1 604 372 with a first tank member which moves relative to a second buoyant tank member. The tank members cooperate in a gas tight manner such that compressed gas or partial vacuum may be used as a source of power. The existing wave energy converters are optimized for energy conversion at a determined, frequently occurring wavelength which is generally local. When wavelengths differ, the efficiency of energy conversion is considerably lower than at the wavelength for which the converter has been optimized.

SUMMARY OF THE INVENTION

The present invention has for its object to provide a wave energy converter of which the adjustment can be optimized for varying wavelengths. In addition, the device must have a simple construction.

The invention provides for this purpose a device for energy conversion from wave movement in water according to the type disclosed above, characterized in that, the device also comprises means for changing the range of the working volume of the container. The working volume of the gas-filled part of the container is varied by mutual movement of the parts of the gas-filled container. The range of the working volume of the gas-filled space thus determines at least partially the spring curve of the device. This spring curve can be influenced by changing the range of the working volume of the gas-filled part of the container. The desired oscillation frequency is thereby variable and the optimal adjustment of the device can be varied for diverse wavelengths. The efficiency of this device is considerably greater than the efficiency of existing devices for wave energy conversion, particularly in an environment in which wavelengths of diverse lengths occur. Another advantage of the device is that it can be placed in solitary disposition, which makes the device useful for applications in which only a limited amount of energy is required. Yet another advantage is that structurally the device can be embodied in very simple manner.

Also GB 1 589 286 discloses a compression device using vertical motion of water according to the type disclosed above. The device includes a float chamber with a movable float so that when the float is acted upon the rise and fall of water motion the volume of the further chamber changes. The device according this patent also lacks means to vary the oscillation frequency.

The means for changing the range of the working volume of the container can be formed in a preferred embodiment by a conduit system with pump with which liquid can be pumped in and out of the container. The range of the working volume of the gas-filled part of the container is varied by feeding respectively draining liquid into and out of the container. The oscillation frequency of the device can thus be influenced in simple manner.

In another preferred embodiment the means for changing the range of the working volume of the container is formed by a displaceable wall part. This displaceable wall part is preferably connected to a cylinder for placing thereof in position as required. This displaceable wall part can be formed for instance by a plunger. The range of the working volume of the container available for gas is variable with such a displaceable wall part. It should be noted here that the displaceable wall part must connect gas-tightly, or at least close-fittingly, onto the inner side of the container since the working volume of the part of the container available for gas is otherwise not varied by displacement of the displaceable wall part. A simple solution herefor lies in a plunger construction, wherein a part of the container forms a cylinder wall onto which the plunger must connect in gastight manner. It will be apparent that the displaceable wall part has to be fixable in different positions to thus enable fixing of the part of the container intended for gas in the desired setting. Displacement of the displaceable wall part and fixing thereof can both take place using a cylinder.

The frame of the device is for instance connectable fixedly to the bottom. It is also possible however to connect the frame flexibly to the bottom. A fixed connection to the bottom has the advantage that the exact position of the device on the bottom is known. This is possible for instance by providing the frame with a heavy concrete socle. A lighter construction can suffice when the frame is connected flexibly to the bottom. What should be envisaged here is an anchoring in the bottom which connects to the frame with flexible elements. The advantage of such a construction is that it can take a lighter form.

A simple construction of the device is obtained when the container is formed by a vertically displaceable hood opened on the underside and a stationary lower container part which connects onto the opened side of the hood. A water barrier is preferably arranged between hood and lower container part. This water barrier can for instance be formed by a rolling membrane. When a water barrier is present, it is possible using this relatively simple construction to prevent uncontrolled change in the range of the working volume of the container available for gas. Account must be taken here not only of liquid flowing in and out of the container but also of evaporation which may be involved here.

The energy converting means consists in a preferred embodiment of at least one hydraulic cylinder, the liquid from which drives an electric generator. The hydraulic cylinder can be placed between the two container parts movable relative to each other such that the hydraulic system is activated at each mutual displacement of the container parts. Electricity for instance can hereby be generated in relatively simple manner. It is noted that the hydraulic cylinder is also a significant factor in effecting a determined amplitude of the oscillation. Further options for adjusting the oscillation frequency result by for instance arranging a mechanical spring or other spring between the container parts displaceable relative to each other.

BRIEF DESCRIPTION OF THE DRAWINGS

The present invention will be further elucidated with reference to the non-limitative embodiments shown in the following figures. Herein.

DETAILED DESCRIPTION OF THE PREFERRED EMBODIMENTS

Figure 1:
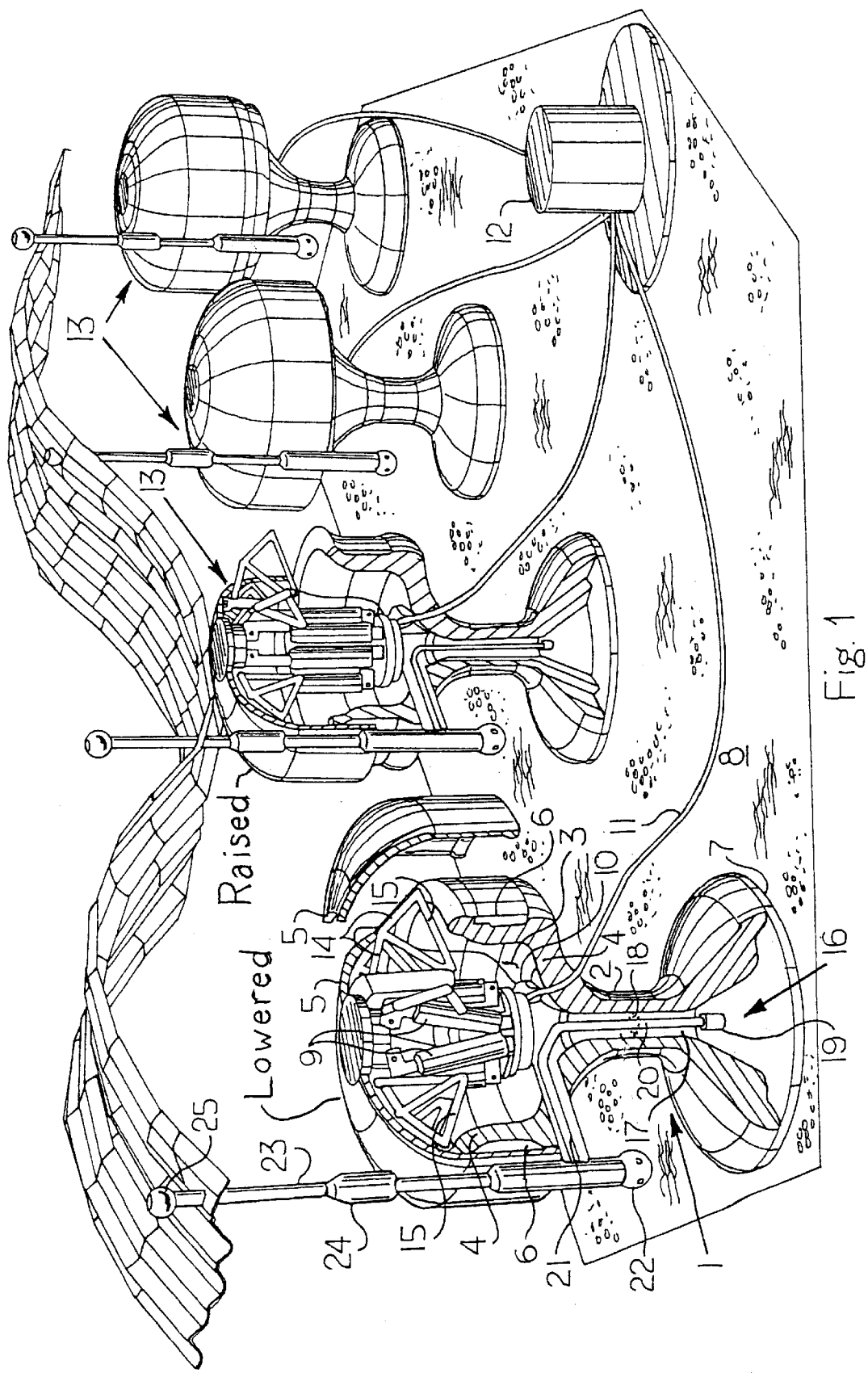
FIG. 1 shows a cut-away perspective view of a first embodiment of the device according to the present invention.

FIG. 1 shows a device 1, a frame 2 of which also forms the lower part of a gas-filled space 3. Frame 2 is provided for this purpose with a standing upper edge 4, the outer side of which connects onto the inner side of a hood 5 which is displaceable vertically relative to frame 2. A rolling membrane 6 is placed between the outer side of edge 4 of frame 2 and the inner side of hood 5 to prevent uncontrolled quantities of water penetrating into the gas-filled space 3.

A foot 7 of frame 2 is placed for instance on a seabed 8. Due to wave movement in the water in which device I is placed, the hood 5 will move in vertical direction relative to frame 2. Hood 5 is connected to frame 2 via hydraulic cylinders 9 which are connected via conduits and at least one hydromotor to electricity generator 10. Electricity generated by device 1 is discharged via a power cable 11 to a distributor 12 to which is connected a plurality of devices 13 corresponding with the device I as shown. Solitary arrangement of device 1 is otherwise also possible.

For strengthening of the hood 5 the inner side thereof is provided with girders 14 and rods 15. The wall thickness of hood 5 can hereby remain limited.

Arranged in frame 2 is an internal space 16 which is filled with water 17. Space 16 transposes into the gas-filled space 3 wherein the boundary surface is formed by water surface 18. The range of the working volume of the gas-filled space 3 can thus be varied by varying the amount of water 17 in frame 2. When more water is supplied the water level 18 will rise and the range of the working volume of gas-filled space 3 becomes smaller. The reverse occurs when water 17 is removed from frame 2. Feeding and draining of water 17 into and out of frame 2 takes place using the pump 19 which connects onto a conduit 20. Conduit 20 then transposes into a conduit 21 provided with an inlet/outlet 22 for water.

The gas-filled space 3 can be opened or closed to the environment. In the embodiment shown here, an air line 23 connects onto gas-filled space 3 which is provided by means of a buoy 24 with a snorkel 25 for drawing air into or blowing it out of gas-filled space 3. A gas-filled space 3 thus results which communicates with the air above the water surface. It is also possible however to embody the device such that air line 23 is omitted and device I comprises a gastight system.

The water level 18 can be varied by operating pump 19, this resulting in a changed oscillation frequency. Pump 19 can for instance be driven using electrical or mechanical energy generated by movement of hood 5.

Figure 2:
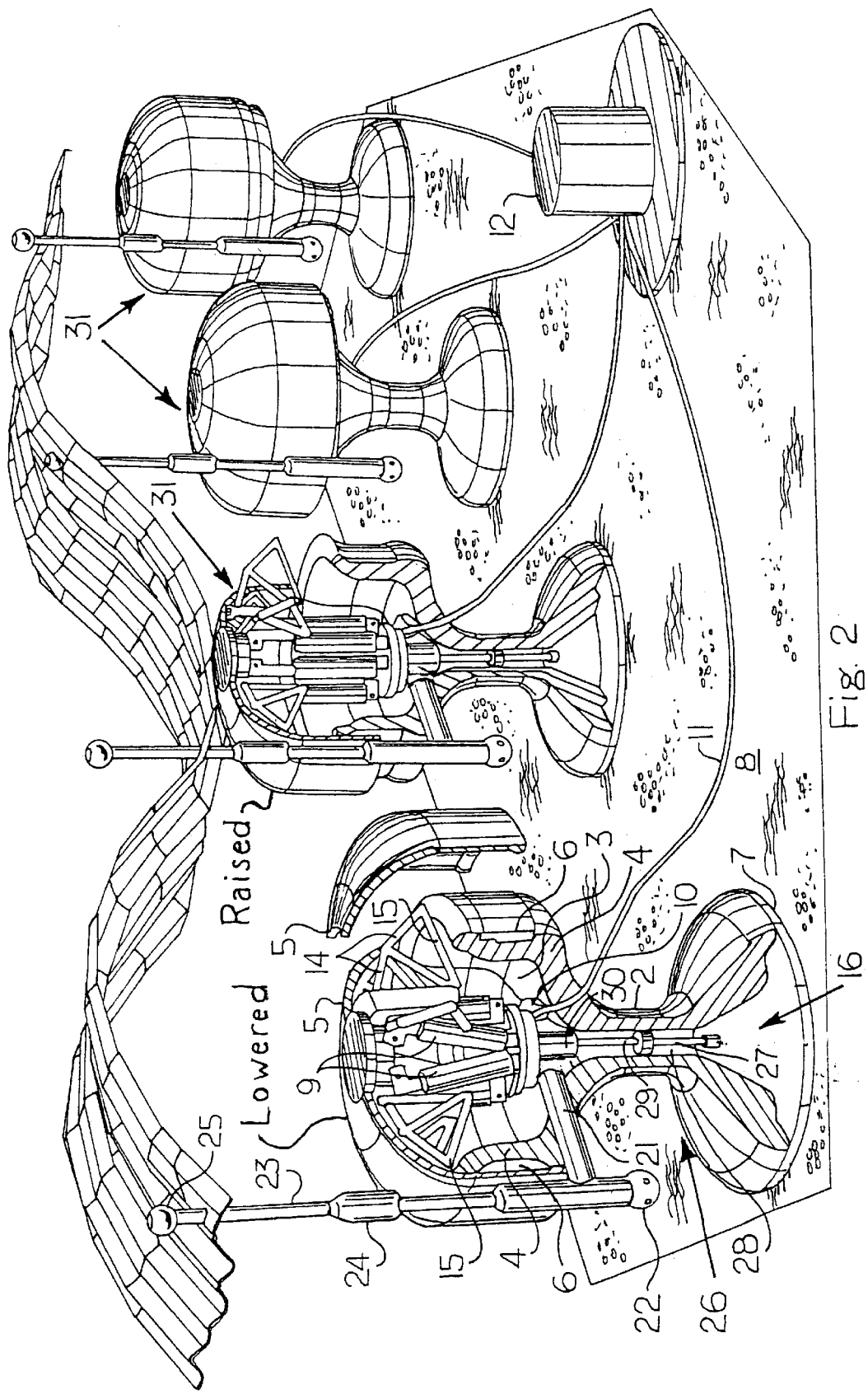
FIG. 2 shows a cut-away view of another embodiment of the device according to the present invention.

FIG. 2 shows a device 26 displaying a great resemblance to the device 1 as shown in FIG. 1. Corresponding components are provided with the same reference numerals. Frame 2 in this figure is thus also connected to the displaceable hood 5 by means of hydraulic cylinders 9. These latter drive generator 10 through displacement of hood 5, all in accordance with the description of FIG. 1.

However, the change in the range of the working volume of gas-filled space 3 in device 26 takes place by means of a plunger 27 which is received gas tightly for displacement in a cylinder housing-like part 28 of frame 2. Plunger 27 is connected via a piston rod 29 to a hydraulic cylinder 30. The position of plunger 27 can thus be changed by hydraulic cylinder 30 and the range of the working volume of gas-filled space 3 can be varied. For draining of water possibly entering gas-filled space 3 or for supplementing of gas from gas-filled space 3 assimilating in the water, this device can also be provided with an inlet/outlet 22 and snorkel 25. It is however quite well conceivable for device 26 to be embodied without these attributes.

The other device 31 shown in these figures can, as required, be of the type as elucidated with reference to FIG. 1 and/or as elucidated with reference to FIG. 2.

What is claimed is:

1. A device for energy conversion from wave movement in water, comprising:

a frame connectable to a seabed;

a container for containing a gas, which container is formed by at least two parts, a first part connected to the frame and a second part displaceable in vertical direction relative to the first container part for varying the working volume of the container; and energy converting means for energy con-version from the displacement of the second container part, wherein the device also comprises means for changing the range of the working volume of the container.

2. The device as claimed in claim 1, wherein the means for changing the range of the working volume of the container is formed by a conduit system with a pump with which liquid can be pumped in and out of the container.

3. The device as claimed in claim 1, wherein the means for changing the range of the working volume of the container is formed by a displaceable wall part.

4. The device as claimed in claim 3, wherein the displaceable wall part is connected to a cylinder for placing the displaceable wall part of the container in a position as required.

5. The device as claimed in claim 4, wherein the displaceable wall part is formed by a plunger.

6. The device as claimed in claim 1, wherein the frame is connectable fixedly to the seabed.

7. The device as claimed in claim 1, wherein the frame is connected flexibly to the seabed.

8. The device as claimed in claim 1, wherein the container is formed by a hood displaceable in vertical direction and opened on the underside and a stationary lower container part which connects onto the opened side of the hood.

9. The device as claimed in claim 8, wherein a water barrier is arranged between the hood and the lower container part.

10. The device as claimed in claim 9, wherein the water barrier is formed by a rolling membrane.

11. The device as claimed in claim 1, wherein the energy converting means consists of at least one hydraulic cylinder, the liquid from which drives an electric generator.

12. The device as claimed in claim 1, wherein the frame and first container part are integrated.

13. The device as claimed in claim 1, wherein a mechanical spring is placed between the container parts displaceable relative to each other.

* * * * *